United States Patent [19]

Matochkin et al.

[11] 4,235,094

[45] Nov. 25, 1980

[54] VIBRATION SAFETY TEST BENCH FOR HAND-HELD RIVETING HAMMERS

[76] Inventors: Vadim V. Matochkin, Bulatnikovsky pereulok, 10, korpus 3, kv. 458; Vladimir S. Nikolsky, ulitsa Priorova, 16, korpus 3, kv. 20; Semen E. Novikov, Altufievskoe shosse, 34a, kv. 255; Valery N. Ryabinin, ulitsa Petrovka, 36, kv. 8, all of Moscow, U.S.S.R.

[21] Appl. No.: 72,680

[22] Filed: Sep. 5, 1979

[51] Int. Cl.$^3$ .................................... G01M 15/00
[52] U.S. Cl. .................................... 73/11; 73/570
[58] Field of Search .................................... 73/11, 570

[56] References Cited

U.S. PATENT DOCUMENTS 3,464,503  9/1969  Houck ............................ 73/11

FOREIGN PATENT DOCUMENTS 602810  4/1978  U.S.S.R. ............................ 73/11

*Primary Examiner*—James J. Gill
*Attorney, Agent, or Firm*—Fleit & Jacobson

[57] ABSTRACT

The vibration safety test bench for hand-held riveting hammers comprises a bed with a dummy work rigidly secured thereto, a mounting for a hand-held riveting hammer under test and a mounting for a dolly, said mountings being located at either side of said dummy work, adapted to be moved along the bed and rigidly connected with simulators of operator's hand input mechanical impedance, one of said simulators interacting with the riveting hammer under test and the other interacting with the dolly, and a vibration pickup designed to sense the vibration of the riveting hammer under test and connected to a vibration metering device.

1 Claim, 3 Drawing Figures

VIBRATION SAFETY TEST BENCH FOR HAND-HELD RIVETING HAMMERS

FIELD OF THE INVENTION

The invention relates to vibration measuring means and has particular reference to vibration safety test benches for hand-held riveting hammers.

The vibration safety test bench for hand-held riveting hammers can be used for conducting type tests on hand-held pneumatic riveting hammers, for making manufacturer's release checks for permissible hammer vibration or user's acceptance, periodic or overhaul checks on hand-held riveting hammers, as well as for research work on vibration insulation of novel hand-held riveting hammers.

The test bench constituting the present invention can also be used for conduction vibration safety tests on dollies used in conjunction with riveting hammers, said dollies being likely to be part of vibration-hazardous equipment. The vibration safety test bench for hand-held riveting hammers can be used to advantage for testing electric riveting hammers.

BACKGROUND OF THE INVENTION

The pneumatic riveting hammer is an intensive source of vibration due to the impact principle of operation.

By transmitting substantial vibration over a wide frequency range to the operator's hands, the hammer causes considerable changes in the bone-muscular, vessel and nervous systems. The complex of these changes is referred to as a "vibration disease" which is one of the most serious occupational diseases.

The investigation of the causes of the disease has made it possible to determine the criteria of the vibration action and to find out the permissible levels of vibration to which the operator is subjected during the working shift.

These criteria are the values of the average square vibration velocity in the octave frequency bands over a range of 11 to 2800 Hz, being different for each octave band.

In this connection the vibration of any power tool acting on the operator's hands must be within the permissible levels, i.e. any hand-held power tool, a riveting hammer in particular, must be periodically checked for vibration safety with a view to rejecting the tools which do not meet said requirements.

Known in the art is a substantially large number of means for measuring and analyzing vibration in the required frequency range. However, the methods of taking measurements on riveting hammers do not ensure true and objective results. The main method of testing riveting hammers for vibration safety is to measure their vibration parameters directly during the riveting work carried out by the operators. The drawback to this method is the subjectivity of the vibration measurements since the magnitude and nature of riveting hammer vibration substantially depend on physiological characteristics of the operator, the pressure exerted by him on the riveting hammer, the grasping force, and the methods of operation. The "vibration disease" is much more likely to develop in the operators who test riveting hammers than in the operators who work with riveting hammers that have passed the vibration safety test. Moreover, the testing of riveting hammers through the use of riveting operators is carried out at a low rate of work.

A more progressive method of testing hand-held riveting hammers is to use test benches without recourse to riveting operators. The test-bench conditions provide for a fairly higher rate of testing work and, above all, provide for objective vibration measurement unbiased by operators' individual characteristics. However, the prior-art benches for testing riveting hammers were devised before the establishment of the present health care limitations on vibration and, therefore, their design does not provide for the operatng range of hammer vibration in the frequency range involved.

Known in the art is a vibration safety test bench for hand-held riveting hammers (refer to USSR Inventor's Certificate No. 189609, class G01M 15/00) which comprises a bed with a dummy work rigidly secured thereto, a mounting for a hand-held riveting hammer under test and a mounting for a dolly, said mountings being located at either side of said dummy work and adapted to be moved along said bed, and a vibration pickup designed to sense the vibration of the hand-held riveting hammer being tested and connected to a vibration metering device. The vibration of the riveting hammer is measured on this test bench by means of a vibrograph capable of registering the amplitude of hammer vibration at the frequency of hammer blows, i.e. within 100 Hz. The riveting hammer under test and the dolly are rigidly secured in the mountings which ignore the influence of the operator's hands on the vibration of the hammer and dolly.

During the operation of the riveting hammer under test its vibration is transmitted to the mountings the mass of which becomes added to that of the hammer, the vibration of the hammer handle being thereby substantially distorted.

It follows that the test bench under consideration does not provide the true operating conditions of the hammer under test and the measurements obtained do not correspond with the actual vibration acting on the operator's organism.

BRIEF DESCRIPTION OF THE INVENTION

It is an object of the present invention to provide a vibration safety test bench for hand-held riveting hammers whereby objective and true checking can be carried out on riveting hammers for vibration safety thereof.

This and other objects are achieved by providing a vibration safety test bench for hand-held riveting hammers which comprises a bed with a dummy work rigidly secured thereto, a mounting for a hand-held riveting hammer under test and a mounting for a dolly, said mountings being located at either side of said dummy work and adapted to be moved along said bed, and a vibration pickup designed to sense the vibration of the hand-held riveting hammer being tested and connected to a vibration metering device. According to the invention, the test bench has two simulators of operator's hand input mechanical impedance one of which is rigidly connected to the mounting for the hand-held riveting hammer under test and interacts with said hammer, whereas the other is rigidly connected to the mounting for the dolly and interacts with said dolly.

The simulators of operator's hand input mechanical impedance are constructed in the form of a single-mass resilient damping system. When this system is subjected to vibration of a wide frequency range, the magnitude and nature of the system dynamic reaction corresponds to the reaction of the operator's hand during riveting work under the specified conditions.

Thus, the measured range of vibration of the handle of the riveting hammer under test is analogous to the range of the vibration acting on the hands of the riveting operator when the latter operates said hammer.

Such a vibration safety test bench provides the maximum possible conditions for securing the hammer under test in the manner of the operator's grasp, whereby true checking of hammer vibration safety can be made without subjecting operators to the harmful effects of vibration.

BRIEF DESCRIPTION OF THE DRAWINGS

Now the invention will be described with reference to the accompanying drawings in which.

DETAILED DESCRIPTION OF THE INVENTION

Figure 1:
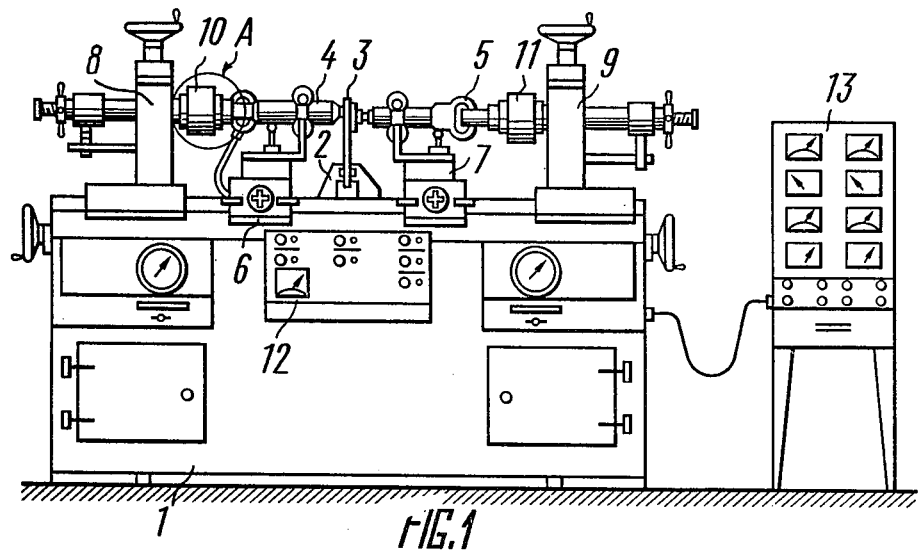
FIG. 1 is a front view of the vibration safety test bench for hand-held riveting hammers.

The vibration safety test bench for hand-held riveting hammers comprises a bed 1 (FIG. 1) with two ways. A pneumatic vice 2 is mounted at the centre of the bed between the ways. Rigidly secured in the vice 2 is a dummy work 3 which is essentially a duralumin plate the size and thickness of which are chosen to suit the type of the hammer to be tested.

The construction of the test bed is symmetrical in relation to the dummy work 3. A mounting for a hand-held riveting hammer 4 under test and a mounting for a dolly 5 are located at either side of the dummy work 3 and adapted to be moved along the ways of the bed 1. The test bench constituting the present invention is used for testing hand-held pneumatic riveting hammers.

The dolly 5 which is used in conjunction with the riveting hammer 4, is shaped substantially like the hammer and, therefore, the mountings for the hammer 4 and for the dolly 5 are similar in construction. The hammer mounting includes a hammer holder 6 and the dolly mounting includes a dolly holder 7. Said holders are designed for locating the hammer 4 and the dolly 5 in relation to the dummy work 3.

To press the hammer 4 and the dolly 5 against the dummy work 3, the hammer mounting has a hammer pressing device 8 and the dolly mounting has a dolly pressing device 9.

Simulators 10 and 11 of operator's hand input mechanical impedance are located at the handles of the hammer 4 and dolly 5, said simulators being adapted for attachment to the hammer and the dolly. The simulator 10 is rigidly secured to the hammer pressing device 8 and interacts with the hammer 4. The simulator 11 is rigidly secured to the dolly pressing device 9 and interacts with the dolly 5.

The simulators 10 and 11 are constructed so that their input mechanical impedance corresponds to the input mechanical impedance of operator's hands.

A control station 12 is mounted on the test bench bed 1.

The vibration of the riveting hammer 4 and the dolly 5 is measured and analyzed by means of a vibration metering device 13 which is essentially a conventional double-acting octave analyzer of vibration with a frequency range from 11 to 2800 Hz. It is equipped with indicating lamps for each of the eight octave bands. Each lamp comes on when the vibration level in the corresponding octave is exceeded.

The vibration metering device 13 is electrically connected to the vibration pickups (not shown) which sense the vibration of the riveting hammer 4 and the dolly 5 and are located inside the operator's hand input mechanical impedance simulators 10 and 11.

Figure 2:
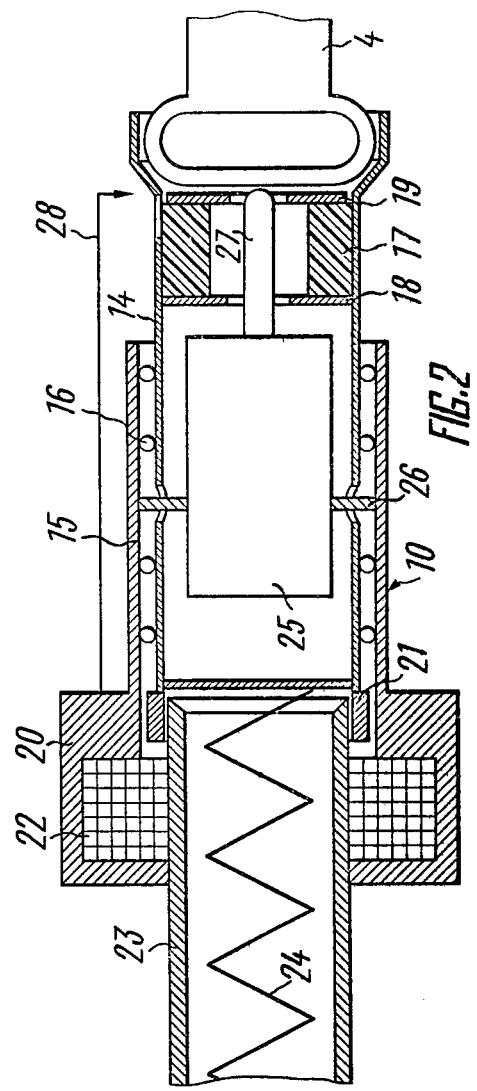
FIG. 2 is an enlarged view of the detail A in FIG. 1 showing the construction of the simulator of the operator's hand input mechanical impedance.

The operator's hand input mechanical impedance simulator 10 comprises a simulation mass in the form of a metal sleeve 14 (FIG. 2) mounted in the simulator case 15 on balls 16. One end of the sleeve 14 has a seat fitted with a resilient damping element 17 and adapted to receive the handle of the riveting hammer 4 being tested. The simulator 11, which interacts with the dolly 5, is constructed in the same manner. The resilient damping element 17 is made in the form of a foam polyurethane ring which is fitted inside the sleeve 14 so that one side of said ring bears against a partition 18 and the other side contacts a washer 19 which is in direct contact with the handle of the hammer 4 (or the dolly 5). Located in the simulator 10 at the other end of the sleeve 14 is an electromagnetic damper comprising a coil 22 and a yoke 20 whose gap accommodates a copper ring 21. The yoke 20 and the coil 22 are rigidly secured to the barrel of a pneumatic cylinder 23. The ring 21 is rigidly secured to the sleeve 14. Inside the pneumatic cylinder is fitted an adjusting spring 24 which provides for pressing the hammer 4 (or the dolly 5) against the dummy work 3 with a force of 30 to 200 N. This force depends on the blow energy of the hammer 4 and is determined by the requirements of the riveting process involved.

The sleeve 14 with the abovementioned elements mounted thereon simulates the corrected mass of a man's hand and has a mass of the order of 1 N·s$^2$/m.

The resilient damping element 17, which has a non-linear dynamic rate and losses about 80 N s/m, simulates the input stiffness and losses of the hand.

The adjusting spring 24, which has a rate of the order of 3000 N/m, simulates the stiffness of the elbow and shoulder joints.

The electromagnetic damper, which has a damping factor of the order of 80 N·s/m, simulates part of the hand viscous friction.

A vibration pickup 25 is installed inside the sleeve 14 of the operator's hand input mechanical impedance simulator 10.

The case of the vibration pickup 25 is rigidly secured to the case 15 of the simulator 10, for example, by means of screwed fastenings. For the purpose provision is made of four studs 26 which pass through oval holes in the sleeve 14 and hold the case of the vibration pickup 25 to the case 15 of the simulator 10.

The vibration pickups 25 of the hammer 4 and of the dolley 5 are conventional feeler-type induction converters. They convert the vibration of the handles of the riveting hammer 4 and the dolley 5 into an electrical signal which is fed through a cable into the vibration metering device 13.

To check for contact between the feeler 27 of the vibration pickup 25 and the handle of the hammer 4 (or the dolley 5) an indicator 28 is mounted on the case 15. The indicator is made in the form of a scribed mark on the washer 19 and a metal pointer mounted on the case 15 of the stimulator 10. When the pointer registers with the scribed mark, the feeler 17 is in contact with the handle of the hammer 4 (or the dolley 5).

Figure 3:
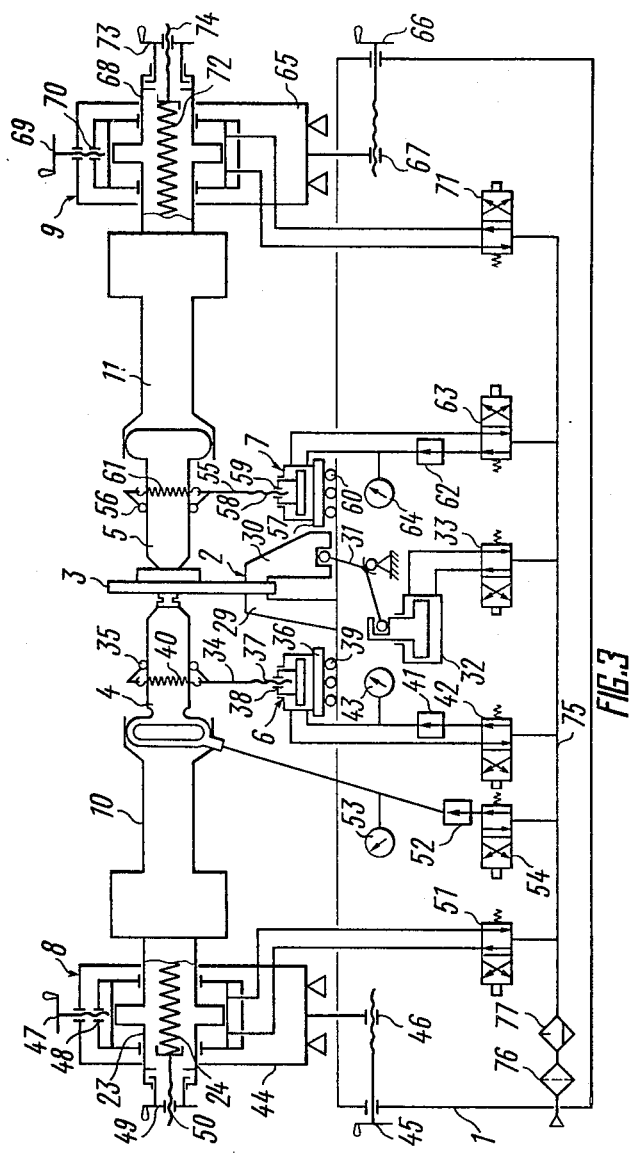
FIG. 3 is a pneumatic diagram of the vibration safety test bench for hand-held riveting hammers.

For a better understanding of operation of the test bench constituting the present invention reference is to be made to the pneumatic diagram in FIG. 3. The pneumatic vice 2 for holding the dummy work 3 comprises a fixed jaw 29 and a movable jaw 30 operated through a lever 31 by a pneumatic cylinder 32 which is controlled by a solenoid-operated pneumatic valve 33.

The hammer holder 6 comprises a carrier 34 with rollers 35 mounted on ball bearings and adapted to grip the body of the hammer 4. For setting up the rollers 35 in a vertical direction, the carrier 34 is mounted on a carriage 36 by means of a screw 37, and a nut 38. The carriage 36 is mounted on rollers 39 for movement along the bed 1.

The gripping force exerted on the body of the hammer 4 is regulated by the use of a spring 40 and an air pressure regulator 41 which controls the pressure of the air supplied through a solenoid-operated pneumatic valve 42, a pressure gauge 43 being provided for an indication purpose. Said gripping force depends on the hammer size and blow energy.

The hammer pressing device 8 comprises a carriage 44 mounted on the ways of the bed 1 and adapted to be moved lengthwise by means of a handwheel-operated screw 45 and a nut 46. The carriage 44 accommodates the pneumatic power cylinder 23 which mounts the operator's hand input mechanical impedance simulator 10 and is designed for pressing the riveting hammer 4 against the dummy work 3.

The pneumatic power cylinder 23 is arranged to a be vertically moved in the carriage 44 by means of a handwheel-operated screw 47 and a nut 48.

The pressure exerted by the spring 24 is adjusted by the use of a handwheel-operated nut 49 and a screw 50.

Lengthwise movement of the pneumatic power cylinder 23 is effected by feeding air into said cylinder through a solenoid-operated pneumatic valve 51.

The working pressure exerted on the riveting hammer 4 being tested is controlled by a pressure regulator 52 and indicated by a pressure gauge 53. The air is fed to the hammer 4 through a solenoid-operated pneumatic valve 54.

The mounting of the dolly 5 is analogous in construction to the mouting of the riveting hammer 4. The dolly holder 7 comprises a carrier 55 with four freely rotating rollers 56 for gripping the body of the dolly 5. To enable the dolly holder 7 to be moved vertically, the carrier 55 is mounted on a carriage 57 through the use of a screw 58 and a nut 59. The carriage 57 is mounted on rollers 60 for movement along the bed 1.

The gripping force exerted on the body of the dolly 5 is regulated by the use of a spring 61 and an air pressure regulator 62 which controls the pressure of the air supplied through a solenoid-operated valve 63, a pressure gauge 64 being provided for an indication purpose. The gripping force exerted on the body of the dolly 5 depends on the blow energy of the riveting hammer 4 beng tested.

The dolly pressing device 9 comprises a carriage 65 mounted on the ways of the bed 1 and arranged for lengthwise movement by provision of a handwheel-operated screw 66 and a nut 67. The carriage 65 accommodates a pneumatic power cylinder 68 which mounts the operator's hand input mechanical impedance simulator 11 designed to hold the dolly 5 and press it against the dummy work 3. To enable the pneumatic cylinder 68 to be moved vertically, the carriage 65 is provided with a handwheel-operated screw 69 and a nut 70. Lengthwise movement of the pneumatic cylinder 68 is effected by feeding air into said cylinder through a solenoid-operated valve 71. The pressure which forces the dolly 5 against the dummy work 3 is exerted by a spring 72. The spring pressure is adjusted by the use of a handwheel-operated nut 73 and a screw 74.

The air distributing equipment, including an air feed line 75, is installed inside the bed 1. Air preparation is carried out by the use of a filter 76 and an oiler 77.

In conducting vibration safety tests on hand-held riveting hammers, the test bench constituting the present invention operates as follows:

The dummy work 3 (FIGS. 1 and 3) is chosen to suit the type of the hand-held riveting hammer to be tested, placed in the pneumatic vice 2 and gripped with the movable jaw 30.

The hammer 4 to be tested and the dolly 5 are installed in the hammer holder 6 and the dolly holder 7 respectively and the required gripping force is set by reference to the pressure gauges 43 and 64.

Then the hammer 4 and the dolly 5 are forced against the dummy work 3 by exerting the required pressure with the hammer pressing device 8 and the dolly pressing device 9. By the use of the indicator 28 a check is made to ascertain that the feeler 27 of the vibration pickup 25 is in contact with the handle of the hammer 4.

The timer (not shown) in the control station 12 is set to the required hammer working time. A signal from the timer initiates delivery of compressed air from the feed line 75 through the valve 54 to the hammer 4. The hammer working pressure is indicated by the pressure gauge 53. The hammer 4 comes into operation and the vibration pickup 25 senses the vibration level which is registered by the metering device 13, measured in each octave band and compared with the vibration level permissible for the bank involved. Lighting of an indicating lamp signals that the hammer does not meet the test conditions.

If the level of fibration of the dolly 5 has to be determined also, the metering device 13 alternately measures the level of vibration of the hammer 4 and the dolly 5.

All the operations are performed automatically by the agency of the control station 12.

The vibration pickup 25 need not be attached to the hammer under test and, therefore, the change of hammers of the same type is a matter of 15–20 seconds. The analysis of vibration in all the octave bands involved takes 2 to 3 seconds, giving go-no-go results.

The working capacity of the test bench constituting the present invention is 100 riveting hammers per hour. Said test bench is simple and dependable in operation and, apart from hammer testing, can be used for determining rivet upsetting time.

What is claimed is:

1. A vibration safety test bench for hand-held riveting hammers which comprises:
   a bed;
   a dummy work rigidly secured to said bed;
   a mounting for a riveting hammer under test, which mounting is located on said bed at one side of said dummy work and is adapted for movement along said bed;
   a dolly mounted on said bed at the other side of said dummy work in line with said riveting hammer under test;

a mounting for said dolly, which mounting is located on said bed at the other side of said dummy work and is adapted for movement along said bed;

two simulators of operator's hand input mechanical impedance, one of which is rigidly connected to said mounting for a riveting hammer and interacts with said hammer, whereas the other is rigidly connected to said mounting for a dolly and interacts with said dolly;

a vibration pickup designed to sense the vibration of said hammer and mounted on said simulator;

a vibration metering device electrically connected to said vibration pickup.

* * * * *